(12) United States Patent
Dov et al.

(10) Patent No.: US 6,199,157 B1
(45) Date of Patent: Mar. 6, 2001

(54) SYSTEM, METHOD AND MEDIUM FOR MANAGING INFORMATION

(75) Inventors: Dan Bar Dov, Tel Aviv (IL); Oded Ben-Haim, Cupertino, CA (US); Roy Lauer, Ramat-Gan (IL); Amotz Maimon, Cupertino, CA (US); Michael Palatnik, Rishon LeZion (IL)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/049,910

(22) Filed: Mar. 30, 1998

(51) Int. Cl.[7] .................................................. G06F 9/455
(52) U.S. Cl. ............................................ 713/1; 712/15
(58) Field of Search ................................. 713/1, 2, 100; 712/15

(56) References Cited

U.S. PATENT DOCUMENTS

| | | | |
|---|---|---|---|
| 5,020,059 | * 5/1991 | Gorin et al. | 371/11.3 |
| 5,588,148 | * 12/1996 | Landis et al. | 395/601 |
| 5,644,487 | * 7/1997 | Duff et al. | 364/140 |
| 5,774,689 | * 6/1998 | Curtis et al. | 395/500 |
| 5,826,065 | * 10/1998 | Hinsberg, III et al. | 395/500 |
| 5,877,819 | * 3/1999 | Branson | 348/701 |
| 5,956,337 | * 9/1999 | Gaddis | 370/395 |
| 6,002,854 | * 12/1999 | Lynch et al. | 395/500.01 |

OTHER PUBLICATIONS

Applied Materials, Inc., *Centura(TM) HDP Dielectric Etch*, Operations Manual, Dec. 1995.

* cited by examiner

Primary Examiner—Thomas C. Lee
Assistant Examiner—Omar A. Omar
(74) Attorney, Agent, or Firm—Hale & Dorr

(57) ABSTRACT

A system, method and medium for configuring an item such as a machine having multiple optional components is provided. This is accomplished using "options," which correspond to the optional components of the machine, and are selected by a user according to those optional components that the user desires to have as part of the machine. Each option is envisioned to be created to contain the necessary properties (such as attributes and constraints) to appropriately configure the corresponding optional component within the machine. Embodiments of the present invention envision that the options can be arranged in a hierarchical option tree to help allow a user to better visualize the structure of the machine in making decisions concerning configuration.

26 Claims, 11 Drawing Sheets

PROJECT DESCRIPTION TREE

```
                              .
                              .
                              .
/. . . USER COMPUTER A /. . . / HARD DISK CONTROLLER A / X TRACKS

/. . . USER COMPUTER A /. . . / HARD DISK CONTROLLER A / Y SECTORS
                                                        PER TRACK

/. . . USER COMPUTER A /. . . / HARD DISK CONTROLLER B / X TRACKS

/. . . USER COMPUTER A /. . . / HARD DISK CONTROLLER B / Y SECTORS
                                                        PER TRACK
                              .
                              .
                              .
/. . . USER COMPUTER A /. . . / HARD DISK A 1 / ROTATION SPEED

/. . . USER COMPUTER A /. . . / HARD DISK A 2 / ROTATION SPEED
                              .
                              .
                              .
```

*FIG. 3*

ICF

⋮

/ . . . USER COMPUTER A / . . . / HARD DISK CONTROLLER A / X TRACKS

/ . . . USER COMPUTER A / . . . / HARD DISK CONTROLLER A / Y SECTORS PER TRACK

/ . . . USER COMPUTER A / . . . / HARD DISK A 1 / ROTATION SPEED

*FIG. 4*

|   | LOCK |
|---|---|
| A | PRINTER A DESELECT PRINTER B |
| B | HARD DISK A 1 REQUIRES FLOPPY DISK C |
| C | HARD DISK A 1 FORCES TAPE BACKUP |

*FIG. 5*

SYSTEM, METHOD AND MEDIUM FOR MANAGING INFORMATION

BACKGROUND OF THE INVENTION

I. Field of the Invention

The present invention relates to a system, method and medium for configuring an item such as a machine, where the item can have a multitude of optional components. With reference to embodiments envisioning configuring a machine, the present invention allows a user to choose from various "options" (representative of machine components) so that the necessary aspects (e.g., software) for operating the desired machine can be implemented. In the course of choosing options, the present invention can guide the user to determine which additional options (and thus which other corresponding machine components) may, e.g., also be required to properly configure the machine in view of those options specifically chosen by the user. It is envisioned that properties of these options are determined by a user prior to choosing the options for configuring the machine.

II. Related Art

Software is increasingly found in various types of electrical and electromechanical devices. For example, over the past few years, devices such as automobiles and toaster ovens have been incorporated with more and increasingly sophisticated software.

Often, software used with a given piece of machinery is written for a particular machine (i.e., a specific configuration of a machine). However, there are also many situations where a "base-model" machine has numerous optional components that can be chosen, requiring a change in the software that is used to operate the machine. For example, many computers can be sold with numerous different options available (e.g., different types and different numbers of hard drives, memory systems, peripherals, etc.). Also, there may be devices that come equipped with numerous different features which a user may want to activate (or deactivate). In any event, it would be very burdensome and highly undesirable for the manufacturer to develop and maintain a complete copy of each type of software suitable for each of the different possible configurations of the machine that users may desire.

In some situations, schemes have been developed to sense which optional hardware components exist in a machine configuration, and automatically configure the software accordingly. These schemes require that each component have some feature that allows it to be identified, typically in the form of some electronic connection. However, a user may want to use components that are not manufactured with such identification features. Implementation of such a feature (either during or after manufacture) for each component can be an expensive and cumbersome proposition, significantly adding to the cost of each component, and thus making the finished machine more expensive.

To provide a user with an efficient and flexible scheme for configuring machines having multiple possible configurations, various techniques and schemes have been developed. One example was the development of the Masterfab Cluster Controller (MCC) by Applied Materials of Santa Clara, Calif. The MCC uses an inheritance-based control hierarchy scheme to assist a user in configuring the particular machine of their choosing. Specifically, the user can choose specific attribues relating to the desired machine configuration, wherein the attributes are stored for use with the machine during its operation.

However, schemes such as the MCC mentioned above are deficient in that the way a user had to configure the machines was still very cumbersome. In addition, such schemes, which often utilize a pure tree-based data model, do not assist the user in determining the relationship between the various components that could be configured. For example, they do not indicate whether certain components of the machine are necessary when other components are chosen, or whether certain components are mutually exclusive with one another (e.g., there are no rule-based constraints associated with them).

Consequently, what is needed is an efficient, "intelligent" scheme for assisting in the choosing of components for the configuration of a machine.

SUMMARY OF THE INVENTION

The present invention addresses the problem described above by providing a system, method and medium for configuring an item such as a machine in a flexible and efficient manner. Specifically, and with regard to configuring machines, it is envisioned that a given machine may be manufactured with any number of user-selectable optional components (e.g., cars and computers often have numerous available optional components). To allow such a machine with a variety of potential components to be flexibly and efficiently configured (e.g., to have appropriate software attributes implemented to operate the machine) once, e.g., specific optional components have been chosen, the present invention utilizes "options."

Options, represented by data in a computer, correspond to the optional components of the machine. They are selected by a user according to the optional components that the user desires to have as part of the machine. Each option is envisioned to be created to contain the necessary information to appropriately configure the corresponding optional component of the machine.

Specifically, in creating options corresponding to the optional components, the present invention contemplates that the options are instilled with various properties. In particular, it is envisioned that these properties include attributes and a form of constraint referred to as "locks." The attributes can represent various features of the corresponding component, such as a specific settings to which a machine component should be set. The locks allow options to be related to other designated options in a variety of ways. For example, a lock can force one option to be chosen if a related option is specifically chosen by a user.

Embodiments of the present invention also envision that the options can be arranged in a hierarchical option tree. This, for example, allows a user to better visualize the structure of the machine in making decisions concerning configuration. In any event, utilizing this combination of option tree hierarchy and constraints helps allow the present invention to provide a flexible and convenient scheme for configuring an item such as a machine having numerous potential components.

Where certain properties may be utilized by more than one option, the present invention also contemplates the creation of an option class. The option class, which itself has various properties associated with it, can be associated with specified options such that those options then take on the properties of the option class (either in whole or in part).

Once the options are set up as described above, embodiments of the present invention then contemplate that the user can choose from those options within the option tree to configure a desired machine (having the desired components). The various requirements for operating the machine (e.g., certain portions of software and/or inputs thereof) are then implemented so that the machine can be appropriately operated.

Although the present invention is described primarily in terms of configuring machines, it should be understood that the various aspects of the present invention are applicable to various other types of items, as well.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIG. 3 depicts an example of a project description tree based upon the example option tree of FIG. 2.

FIG. 4 depicts an example of an instance creation file based upon a hypothetical selection of certain options from the example option tree of FIG. 2.

FIG. 5 depicts examples of locks as contemplated by embodiments of the present invention.

DETAILED DESCRIPTION

The present invention relates to a system, method and medium for configuring an item such as a machine, where the item can have a multitude of optional components. With reference to embodiments envisioning configuring a machine, the present invention allows a user to choose from various "options" (representative of machine components) so that the necessary aspects (e.g., software) for operating the desired machine can be implemented. In the course of choosing options, the present invention can guide the user to determine which additional options (and thus which other corresponding machine components) may, e.g., also be required to properly configure the machine in view of those options specifically chosen by the user. It is envisioned that properties of these options are determined by a user prior to choosing the options for configuring the machine.

Embodiments of the present invention contemplate that "options" and the properties they possess are created by a user using various editing tools which will be described further below. In any event, the type and number of options created will be based upon some type of blueprint indicating the possible components that the machine(s) might have. This blueprint thus represents at least the superset of the components needed for any machine that a user may desire to configure. Some of these components may be optional (and thus may or may not be chosen by a user) while others may be required (either as an integral part of all possible configurations or as a result of choosing a particular component). This blueprint might also describe various relationships between the components. Embodiments of the present invention, in effect, envision possibly using this blueprint as a conceptual starting point in assisting a user to appropriately configure (e.g., prepare for use) a desired machine configuration.

Figure 1:
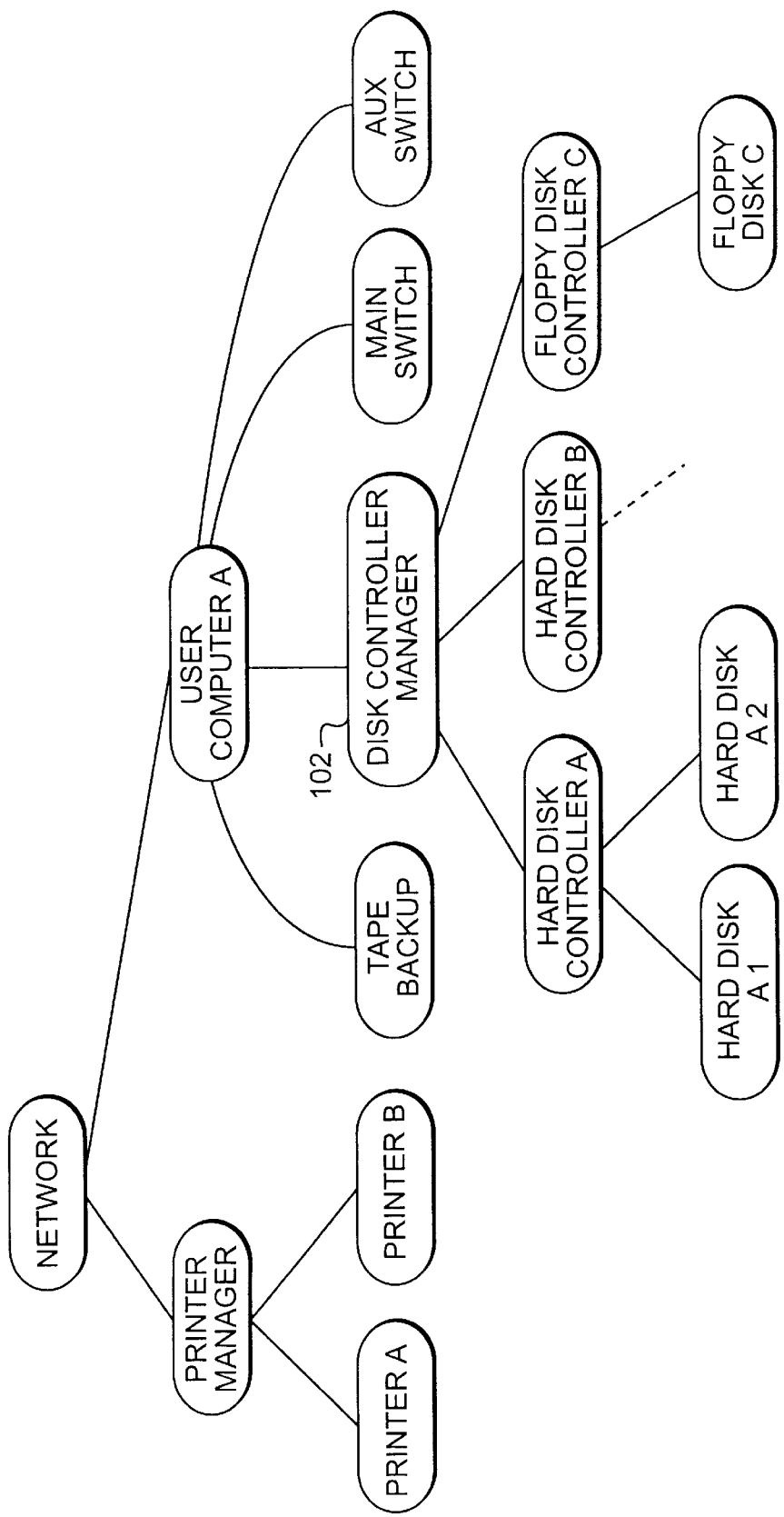
FIG. 1 is hierarchical diagram depicting example components of a machine.

An example of such a blueprint depicting various possible hardware components is shown with regard to FIG. 1. Referring now to FIG. 1, a computer network having various possible components that can be used to make up a specific configured machine is shown. In particular, the example of FIG. 1 depicts what can be viewed as a "control hierarchy," in which the higher-level components "control" the lower-level ones (e.g., "disk controller manager" controls "hard disk controller A," which then controls "hard disk A1"). In addition, within this hierarchy, it is contemplated that certain aspects of the higher-level (i.e., "parent") components can automatically apply to the lower-level ones. Thus, FIG. 1 contemplates a scheme having certain object-oriented characteristics, yet also having control ramifications as well.

In order to allow the user to not only choose a particular configuration for a desired machine, but also to assist the user to ensure that a "sound" configuration is chosen, the present invention contemplates that the options are structured and implemented so that the appropriate properties are conveniently associated with each option, enabling the appropriate software (and appropriate attributes thereof) for the corresponding machine component to be implemented as a result of choosing the option. The present invention contemplates that such structuring and implementation of the options can be done using any number of available techniques. One such technique is to create an object-oriented "option tree" hierarchy, as shown in FIG. 2.

Figure 2:
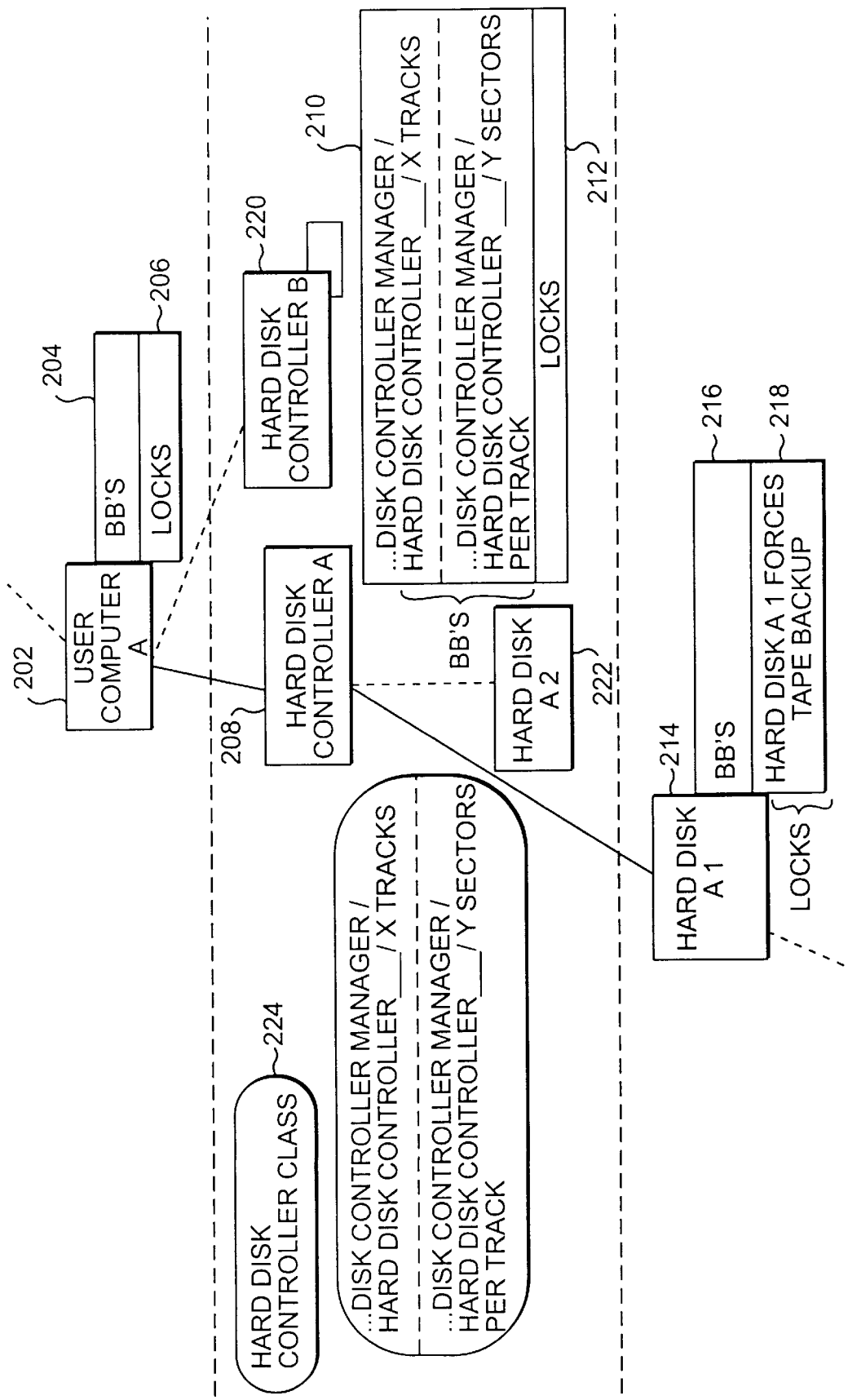
FIG. 2 is a hierarchical diagram of an option tree and an option class based upon the example machine of FIG. 1.

The options in the option tree example of FIG. 2 are based (at least conceptually) on the machine component possibilities depicted in the control hierarchy example of FIG. 1. Referring now to FIG. 2, the option tree is composed of a series of "options" representing corresponding machine components that the user can choose. For example, hard disk controller A 208 is one such option that can be chosen by the user. Each of the options has associated "building blocks" (BB's) as well as "locks," which give the option its associated properties.

As envisioned in conjunction with embodiments of the present invention, the option tree of FIG. 2 displays all the options which can be chosen by the user, while the control hierarchy of FIG. 1 displays the corresponding physical components (which can include software components) that might be included in a configured machine (though not all of which are necessarily selectable in the option tree). For example, the "disk control manager" 102 as shown in FIG. 1 might not be a selectable option by itself, but may always be automatically included with the selection of the option corresponding to "user computer A" 202 (thus, note that the disk control manager does not appear in FIG. 2 as an option).

Embodiments of the present invention envision that the use of the option tree is to provide a user with a convenient scheme for organizing and visualizing the potential configurable machines and optional components therein. However, embodiments also envision that the options in the option tree can inherit the properties of their "parent" option. Thus, in those embodiments, a "child" option may inherit properties from a "parent" option.

Regarding the building blocks, these are envisioned to contain certain attributes to be implemented in association with the corresponding machine component. For example, for the option of hard disk controller A (208), the associated building block (210) indicates the number of tracks and the number of sectors per track that hard disks under its control are to have. (Though attributes include, e.g., "x tracks," it should be understood that embodiments of the present invention also envision that x could be a specific number.) It should be noted that these attributes are associated with hard disk controller A's position in the control hierarchy in order to properly identify the attribute with the appropriate instance of hard disk controller (i.e., "network/user computer A/disk controller manager/hard disk controller_", the first two portions ("network/user computer A") having been omitted from the building block shown in FIG. 2 for brevity.

In embodiments of the present invention, it is contemplated that there may be situations where options of like or similar type within the hierarchy (e.g., all hard disks) are likely to use the same attributes. In such situations, it is envisioned that some scheme can be implemented wherein the appropriate attributes are created so that they can be used (and re-used) by designated options. Specifically, in embodiments contemplated by the present invention, "option classes" can be created, comprising attributes and partially unresolved instances. These option classes can serve as templates for automatically setting default properties of an option, if desired by a user. In particular, embodiments of the present invention contemplate that an option may inherit these properties as defined in the classes or add to them or override them (completely or in part).

In the example of FIG. 2, a hard disk controller option class 224 has been created, and the attributes therein are used by the building block 210 associated with the option "hard disk controller A" 208. The "hard disk controller_" instance in building block 210 is thus partly unresolved (i.e., the "_" represents an unresolved parameter) since it is derived from the hard disk controller class, which may be used by other options (e.g., hard disk controller B 220).

Embodiments of the present invention contemplate that the building block contents could also be used for concepts other than for configuring machines. For example, the building blocks could contain paragraphs of text in an instruction manual for a device such as a car. Then, depending upon the optional accessories chosen by the buyer, a custom instruction manual can be generated. As a specific example, if the buyer chose a car with air conditioning, then a user of the present invention could choose an "air conditioning" option, resulting in the appropriate paragraph(s) appearing in the manual. If the user further chose that the air conditioning unit should contain a thermostat, the user would also choose the thermostat option (which would be a "child" option of the previous air conditioning option). Moreover, embodiments of the present invention also allow certain paragraphs to, e.g., be chosen if others are selected (using a scheme such as "locks," described below). Of course, it should be understood that the present invention contemplates use with all types of various items other than configuring machines and creating manuals.

In addition to associating various attributes with the options (through the building blocks), the present invention also envisions that a certain level of guidance or "intelligence" can be implemented to assist a user in configuring an appropriate and workable machine from the available optional machine components (as reflected by the options presented to the user). Thus, for example, there may be certain optional machine components that are required or that must be excluded if other machine components are used. As a particular embodiment for facilitating this goal, the present invention contemplates utilizing option constraints called "locks," which can be associated with the various options and option classes. As an example, lock 218 is shown as associated with the option "hard disk A1," indicating that choosing hard disk A1 "forces" the choosing of the tape backup. In other words, if a user chooses the option "hard disk A1," the tape backup option (not shown in FIG. 2, but assumed to exist for the purposes of this example) must also be chosen as an option. Embodiments of the present invention envision that the mandatory choosing of the tape backup option can be automatic. It should be understood, however, that the present invention also contemplates other schemes for implementing this type of relation functionality, and is not limited to the use of "locks" as specifically defined herein.

Ultimately, after the desired options are chosen, it is envisioned (in, e.g., machine configuration embodiments) that software is generated (incorporating the chosen attributes based on the building blocks) that operates the machine having components corresponding to the chosen options. In addition, it is envisioned by embodiments of the present invention that when selecting an option from the hierarchical option tree, an option may be selected only if its "parent" option was selected. (Alternatively, the parent option can be automatically selected when the child option gets selected).

As indicated above, the building blocks of the various options contain the various attributes that are utilized in conjunction with the individual options. Embodiments of the present invention contemplate that all of these attributes (along with their associated instance designations) are stored together in a "project description tree" (PDT). Consequently, the PDT has in it all of the attributes and associated resolved instances (i.e., each machine component is uniquely described) for all possible configurations of machine components. Thus, for example, as shown with regard to FIG. 3, the PDT contains all permutations of the attributes associated with both hard disk controller A and hard disk controller B. (Thus, even though there is a hard disk controller class, all possible instance and attribute permutations are accounted for here.)

Embodiments of the present invention contemplate that the PDT is the result of all of the building blocks associated with the options created for the option tree.

When a user finally chooses various options from the option tree to configure a desired machine, various characteristics of those options, such as those indicated by the attributes associated with the options, are implemented. In particular, embodiments of the present invention envision that the relevant instances and attributes for the specific configuration of the machine chosen are placed into an instance creation file (ICF). Embodiments of the present invention contemplate that this ICF contains all of the resolved instances and associated attributes from the relevant building blocks from the user-chosen options and, therefore, from the relevant corresponding portions of the PDT. Embodiments of the present invention also contemplate that the ICF is a derivative of the PDT.

An example of an ICF where the Hard Disk Controller A and Hard Disk A1 options were chosen is shown with regard to FIG. 4. Referring now to FIG. 4, it can be seen that the various instances and attributes corresponding to the building blocks of those options (where the instances are fully resolved, as in the PDT) are shown. Any other instances and attributes corresponding to options chosen to make the specific configuration desired by the user would also go into this ICF. Embodiments of the present invention envision that the ICF is created after the user has selected all options.

It is envisioned by embodiments of the present invention that when the specifically designed machine is started, the ICF is accessed so that the attributes stored therein can be accessed and utilized. In particular, choosing certain options may cause appropriate portions of software (e.g., subroutines) to be accessed and executed during the operation of the configured machine. The attributes of the ICF would themselves be used as inputs for this software.

Of course, it should be understood that the present invention also contemplates the use of schemes other than the ICF, where various attributes (or the like) can be chosen and stored.

As mentioned above, the present invention contemplates the use of various types of constraint-like mechanisms for ensuring that certain options are appropriately designated when other options have been chosen. One such mechanism previously mentioned is a "lock," which adds a level of guidance to the machine configuration process. Certain specific types of locks contemplated by the present invention are as follows:

(1) "Option A requires Option B"—use of this lock indicates that Option A may be selected only if Option B is already selected.

(2) Option A forces Option B—this lock indicates that if Option A is selected, and the parent option of Option B has already been selected, then Option B, itself, is selected automatically.

(3) Option A deselects Option B—this lock indicates that where either one of these options is selected, the other is then automatically deselected.

In addition to being associated with specific options, embodiments of the present invention envision that the locks can also be one of the properties of an option class, and thus can be re-used. For example, a lock "Option__ requires Option__" could be associated with an option class, and the blank would be resolved to include the particular option(s) chosen.

Of course, the present invention contemplates the use of other specific types of locks, as well.

FIG. 5 depicts examples of the usage of the locks mentioned above, in the context of the example machine components depicted in FIG. 1 (and options envisioned to exist with regard to FIG. 2, some of which are not shown). Referring now to FIG. 5, lock A indicates that if Printer A is selected, then Printer B would be deselected and vice versa. If this lock were to exist, for example, as part of a printer option (for either printer A or B), then only one of those printers could be selected at any one time.

Lock B indicates that hard disk A1 specifically requires floppy disk C. This might be put into effect in conjunction with the hard disk A1 option (of, e.g., FIG. 2), where, for example, it is necessary for each configured machine to have at least one floppy disk.

Lock C indicates that the hard disk A1 forces the tape backup. Thus, selection of the hard disk A1 will automatically cause the choosing of the tape backup option. This could, for example, be implemented where a tape backup is considered critical for any machine configured with a hard disk.

Figure 6:
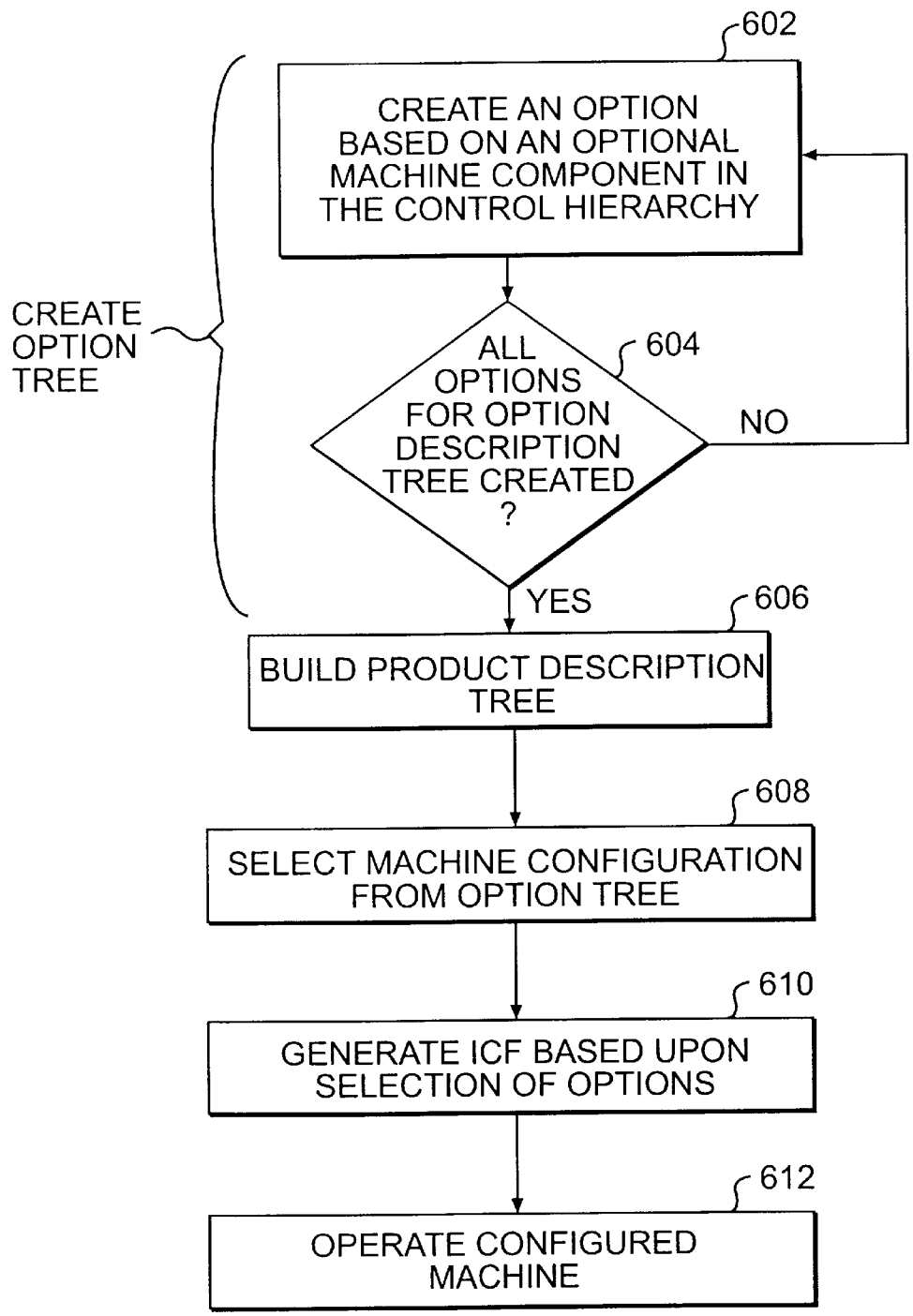
FIG. 6 is a flow diagram of a method for creating and selecting options, as contemplated by embodiments of the present invention.

Methods contemplated by embodiments of the present invention regarding the generation of structures mentioned previously are discussed with regard to FIG. 6. Referring now to FIG. 6, the first step is that an option based on an "optional" machine component in the control hierarchy is created, as indicated by a Block 602. Thus, as indicated previously, options are created only for "optional" components of the machine, since those components that are mandatory would not require an option (i.e., they are just included in the machine).

The next step is to determine whether all options that a user would wish to create for the option tree have been created, as indicated by a decision Block 604. If the answer is "no," then an additional option will be created, and control will go back to Block 602. Otherwise, if all desired options have been created, then the next step is to build a product description tree (PDT) based on the building blocks associated with the chosen options, as indicated by a Block 606. The PDT was discussed previously with regard to FIG. 3.

Once the various options and PDT are in place, the next step is to select a machine configuration from the option tree, as indicated by a Block 608. Embodiments of the present invention contemplate that the actual selection can be accomplished using any number of user interface techniques (e.g., graphical editors), where the available options can, for example, be displayed to a user, who then selects desired options using any number of input devices.

The next step is the generation of an ICF based upon the selected options from the option tree, as indicated by a Block 610. As indicated above, embodiments of the present invention contemplate that the ICF is derived from the appropriate components in the PDT, and thus the ICF is a derivative of the PDT.

Finally, the machine as configured by the user is operated, as indicated by a Block 612. It is envisioned that the ICF is used as input for the software operating the configured machine (e.g., the software reads in the attributes as input).

Of course, it should be understood that, in addition to the steps described with regarding FIG. 6, additional or alternative steps, as well as a different ordering of the steps described herein, are also contemplated by embodiments of the present invention.

Figure 7:
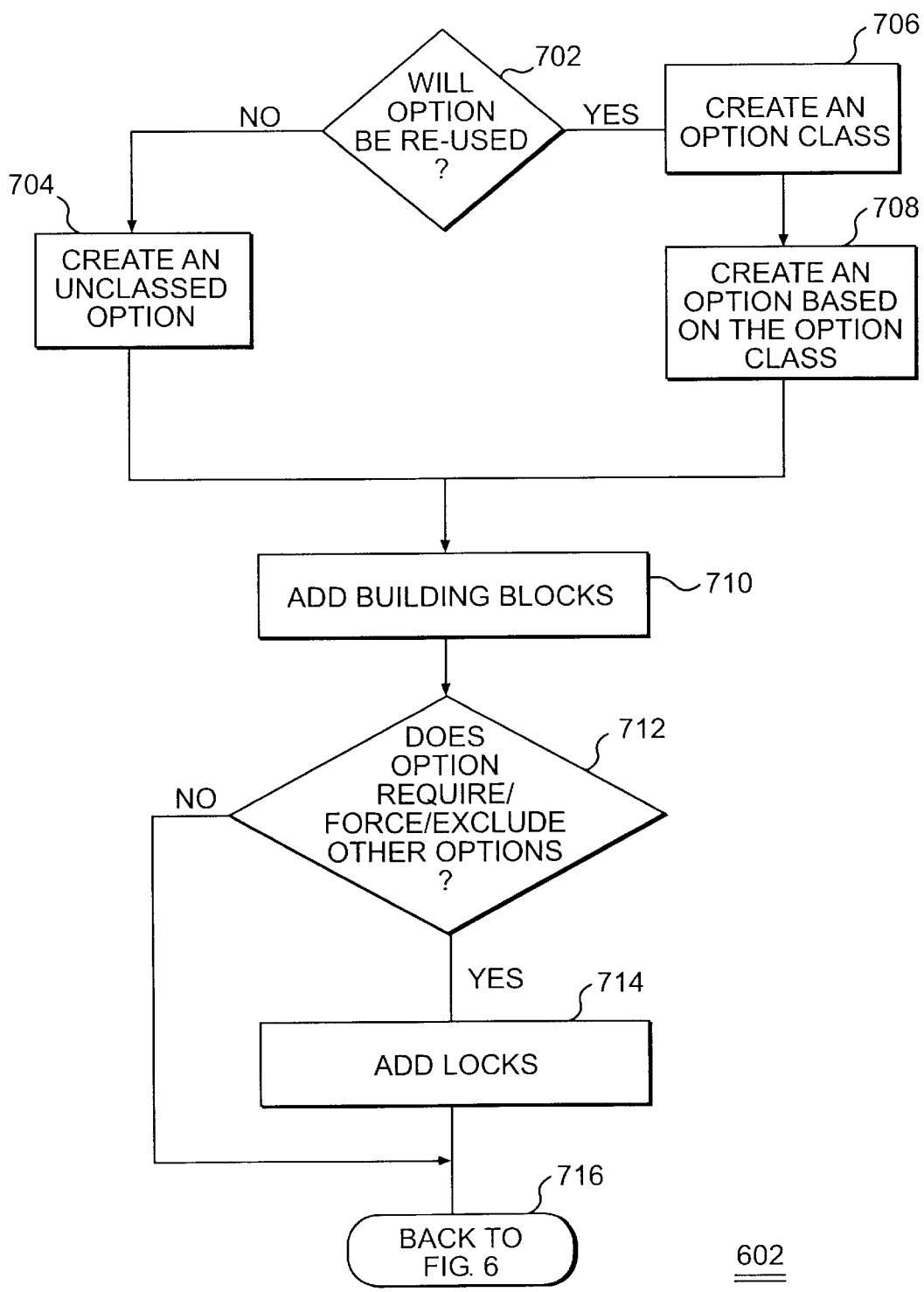
FIG. 7 is a flow diagram of a method for creating options, as contemplated by embodiments of the present invention.

FIG. 7 is a more detailed illustration of the operation of Block 602 of FIG. 6. Referring now to FIG. 7, the first step is to determine whether the option that is being created will be re-used (e.g., the building block attributes will be used by other options), as indicated by a decision Block 702. If the answer is "yes," then an option class will be created if one does not already exist, as indicated by a Block 706. Embodiments of the present invention contemplate that the option created will then, itself, be based upon this option class (that is, it will utilize the attributes of the option class) as indicated by a Block 708. If the appropriate option class already existed for the created option, then the option will just be created based upon this existing option.

If, however, the option will not be re-used, then an unclassed option will be created, as indicated by a Block 704. In that situation, it is envision that all the attributes and associated instances will be completely defined.

In either of the above cases, the option is associated with an appropriate position within the hierarchy of the option tree.

The next step is to add the building blocks to the option, as indicated by a Block 710. Here, the instances and associated attributes are associated with the option or option class. If an appropriate option class was already created, the option will merely utilize that class' building block information (or add additional information).

The next step is to determine whether the option requires/forces/excludes other options, as indicated by a Block 712.

In other words, should there be any locks associated with this option. If "yes," then the locks are added, as indicated by a Block 714. If "no," then step 714 is skipped. As indicated above, the particular locks as mentioned in decision Block 712 are exemplary. In addition, the present invention contemplates that various types of constraint schemes can also be used.

In general, it should be understood that the various steps, and ordering thereof, are exemplary, and that the present invention contemplates that other steps and step ordering are also envisioned.

Figure 8:
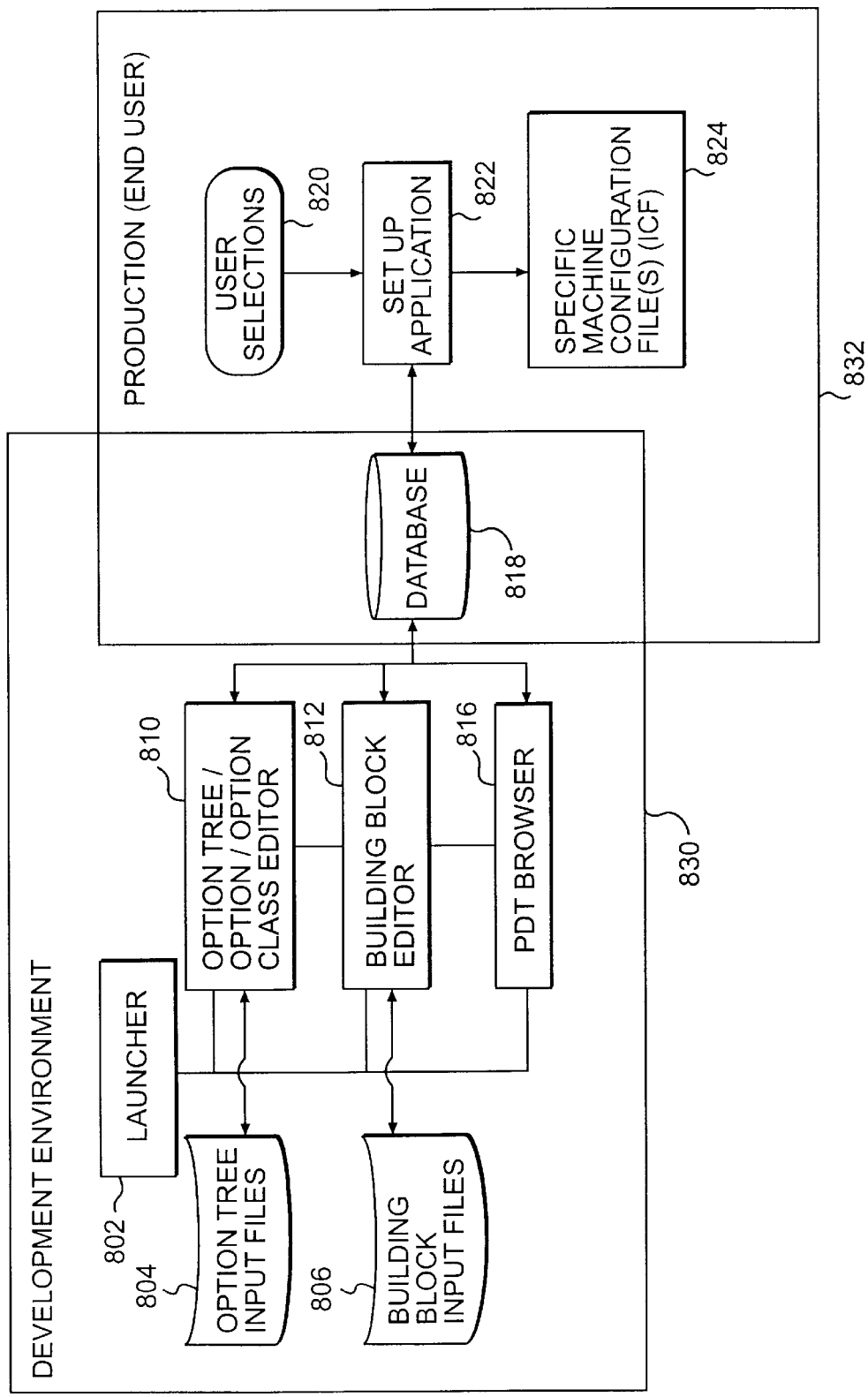
FIG. 8 is a diagram showing an example environment used for creating and choosing options, as contemplated by embodiments of the present invention.

FIG. 8 depicts an exemplary environment in which the present invention may be utilized. Referring now to FIG. 8, there is shown a "development environment" 830, in which the various structures of the present invention, previously mentioned, are created and defined. In a production or "end user" environment 832, an end-user can then select the options previously created in order to configure a specific machine.

Referring first to the development environment of Block 830, it is envisioned that various editors and files exist to create, edit and store the various structures of the present invention previously mentioned. Specifically, embodiments of the present invention contemplate that the options and option classes can be created and edited using the option tree/option/option class editor 810, and the building blocks associated therewith can be chosen therefrom. Option tree input files 804 are envisioned to contain items such as a list of potential options which may be created. Similarly, building block input files 806 are stored with instances and attributes, which can be edited by the building block editor 812, and ultimately associated with an option or option class using option tree/option/option class editor 810. The resulting option tree containing the options, option classes and associated properties (e.g., building blocks and locks) is then stored in database 818. In addition, the PDT, which is created from the building blocks associated with the options, is also stored in database 818. The PDT can be browsed using PDT browser 816. Thus, the database 818 is given the necessary information for an end-user to simply choose the pre-prepared options to configure the desired machine.

Embodiments of the present invention contemplate that the various editors and browsers (810, 812 and 816) are interconnected (as shown by the non-arrowed lines connecting them) and are initiated via a "launcher" interface 802.

With regard to the end user environment 832, the user selects the options to be chosen using setup application 822. In this way, the user selects the desired configuration. The present invention envisions that any number of schemes utilizing input devices can be used for making the selections. Then, based upon the options chosen, the appropriate portions of the PDT are obtained to form the ICF in file(s) 824. The ICF can then be used to operate the machine as configured by the user.

It should be understood that the environments shown and described with regard to FIG. 8 are by way of example, and that the present invention contemplates other types of situations, as well. For example, the end-user may also be involved with the development and editing process of the individual options, as well (and, thus, developer and end user are the same entity). In addition, it should also be understood that the specific types of editors and files are exemplary, and the present invention envisions other types and schemes for implementing the features of the present invention as well.

Embodiments of the present invention contemplate that, within the end user environment, the user may be generating the software to configure a physical machine that has already been constructed, or to test whether a desired configuration is feasible. However, embodiments of the present invention also contemplate that choosing the options also automatically causes the physical components of the machine to be assembled, as well (i.e., the configuration generation can also include the physical assembly of the machine) and/or draws a schematic of the chosen machine.

Figure 9A:
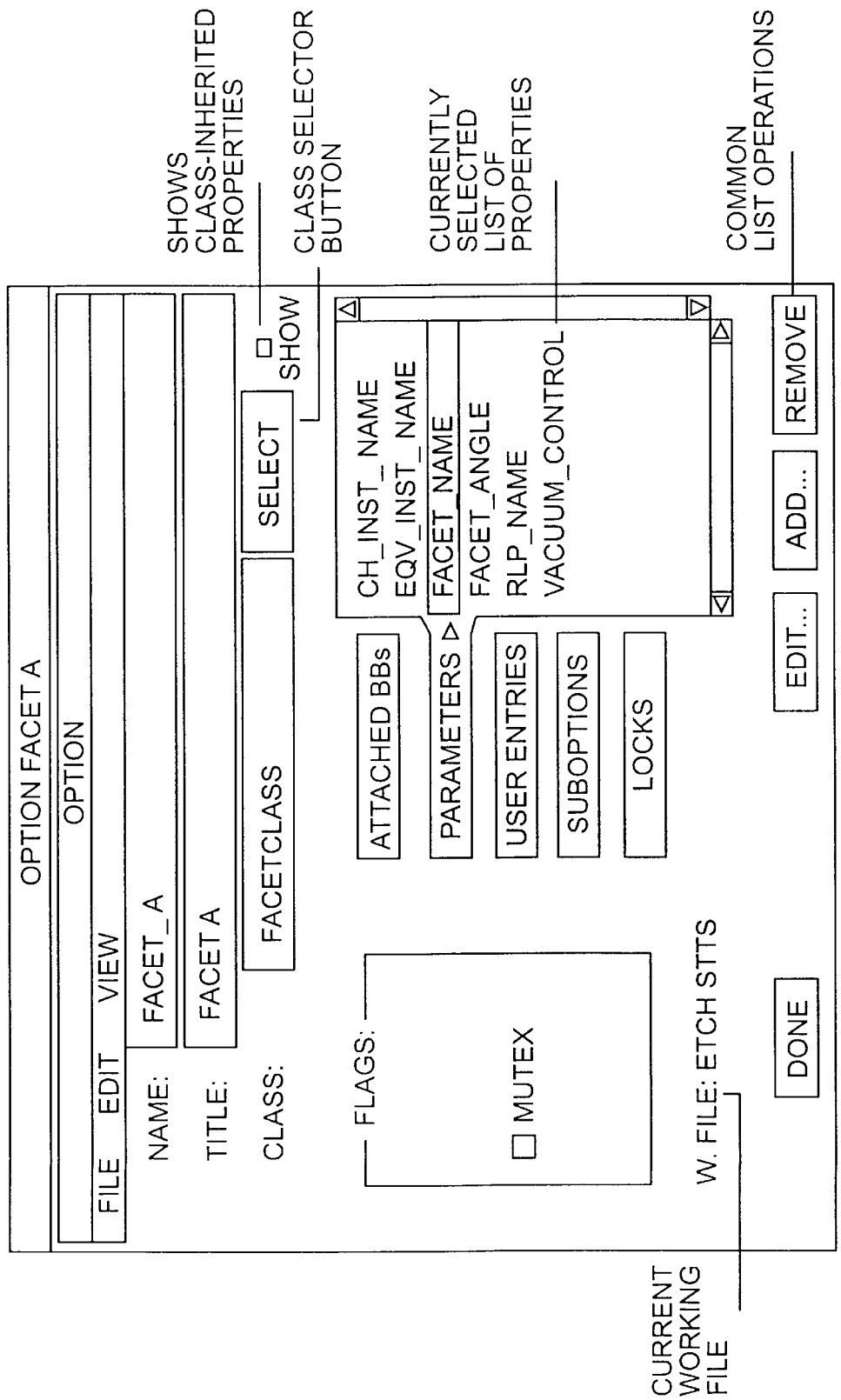
FIGS. 9A and 9B depict example interfaces, as contemplated by embodiments of the present invention.
Figure 9B:
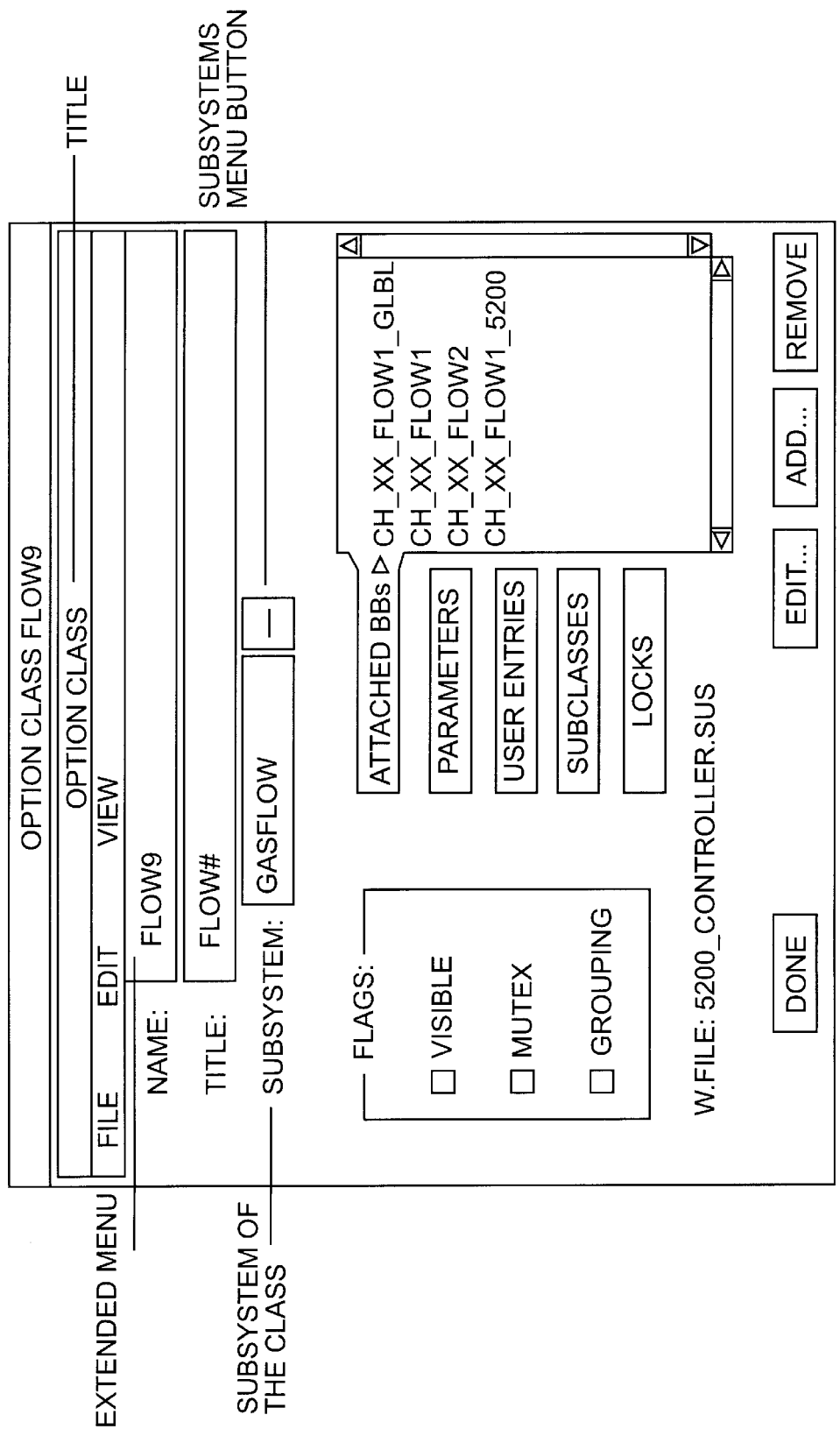

FIGS. 9A and 9B depict examples of user interfaces that can allow a user to view and edit the contents of a particular option or option class. Referring first to FIG. 9A, various property and property types of an option are shown. For example, the "name" of the option (typically corresponding to the name of the potential component to be included into the configured machine) is shown here as "facet_A." It is also shown that this option belongs to the class "Facet-Class." Thus, the various aspects (e.g., building blocks) associated with FacetClass are also associated with this particular option (unless specifically overwritten, which embodiments of the present invention allow). Also as shown, the user may choose to view various aspects of the option, including attached building blocks, parameters (i.e., unresolved instances associated with option classes) and suboptions (i.e., "child" options in the option tree hierarchy; designating options as suboptions using menu schemes of similar nature to that shown in FIG. 9A, as well as pull-down menu schemes and tree diagrams, are ways the present invention envisions options being positioned within the hierarchy of the option tree). In this particular example, the user is viewing the various parameters of the option. Also viewable and editable are the locks.

FIG. 9B shows a corresponding user interface for viewing and editing an option class. In this particular case, a different option class is being shown from the one depicted in the option of FIG. 9B (specifically, "Flow 9"). In addition, the class is shown to belong to a subsystem (which is a group of option classes from which the option classes can, themselves, inherit various properties), which embodiments of the present invention also contemplate to exist.

With regard to FIGS. 9A and 9B, it should be understood that these user interfaces are shown by way of example, and that the present invention contemplates that any number of other user interfaces can be used for creating, viewing, and editing options and option classes, and associated information belonging thereto.

Figure 10:
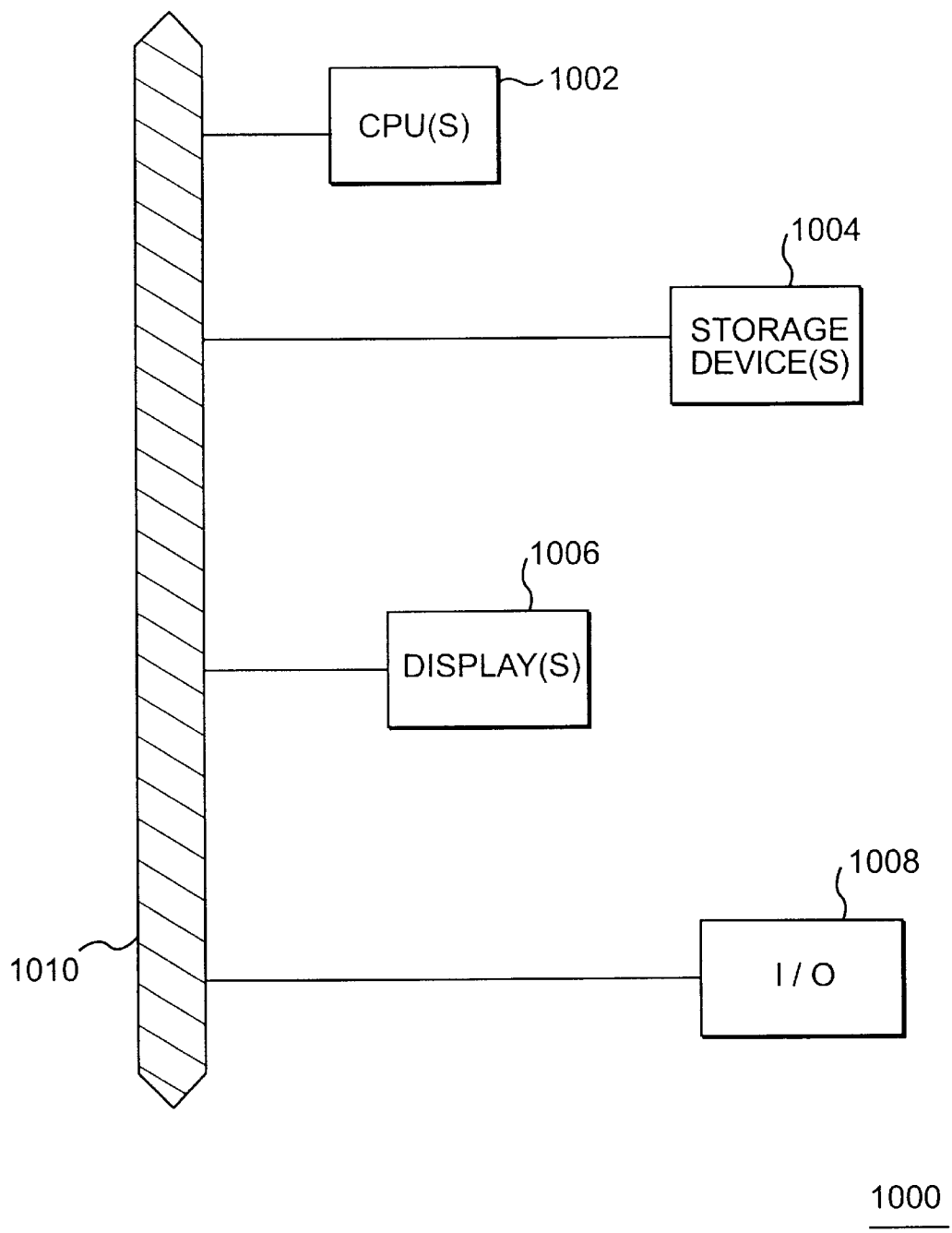
FIG. 10 is a block diagram of a computer environment, components thereof and communication schemes used therewith, as contemplated by embodiments (and environments thereof) of the present invention.

FIG. 10 shows some exemplary hardware for use as part of and/or as the environment of the present invention. Referring now to FIG. 10, one of more CPU's 1002 are shown, connected to one or more storage devices 1004 by bus 1010. The CPUs could be any number of different types, such as any of the line of Intel CPUs such as the Pentium or Pentium II manufactured by Intel of Santa Clara, Calif., or ones manufactured by Motorola of Schaumburg, Ill. The storage device(s) 1004 are contemplated to be various computer memories (e.g., RAM, EPROM, etc.) as well as disk storage. It is contemplated that one or more aspects of the present invention are located in storage device(s) 1004.

Also attached to bus 1010 is one or more displays 1006, providing a user with a visual interface for preparing and editing various aspects of the present invention. Also shown attached to bus 1010 is an I/O 1008, which is contemplated to be various devices such as keyboard and mouse, as well as devices for interfacing aspects of the present invention with the actual hardware that is to be implemented as per the various options chosen.

The computer 1000 having the various components mentioned above can be any number of computers, such as a SparcStation 5 from Sun Microsystems of Mountain View, Calif., or a Pentium-based computer, and can be used in any number of operating systems, such as Sun OS or Microsoft Windows from Microsoft Corporation of Redmond, Wash.

It should be understood that the "user," as mentioned herein, can itself be an automated entity such a computer or computer program.

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using C, C++ or Smalltalk programming languages.

It is also to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A computer-implemented method for configuring an item, wherein said item comprises two or more optional components, comprising the steps of:
   (1) creating two or more options, wherein said two or more options correspond to said two or more optional components;
   (2) associating attributes with each of said two or more options, wherein said attributes relate to characteristics of said two or more components;
   (3) creating, from said two or more options, a hierarchical option tree;
   (4) selecting one or more options from said option tree;
   (5) implementing, responsive to said step (4), at least one attribute corresponding to said one or more selected options, and placing said at least one attribute into an instance creation file; and
   (6) accessing and utilizing said instance creation file during the operation of said item.

2. The computer-implemented method of claim 1, wherein said step (2) comprises the step of associating a designated option of said two or more options with an option class, wherein said option class contains inheritable attributes, and wherein at least some attributes of said designated option are thereby inherited from said option class.

3. The computer-implemented system of claim 1, further comprising the step of associating an option constraint with a first option of said two or more options, wherein said option constraint implements a relation between said first option and a second option.

4. The computer-implemented method of claim 3, wherein said step (2) comprises the step of associating a designated option of said two or more options with an option class, wherein said option class contains inheritable constraints, and wherein at least some constraints of said designated option are thereby inherited from said option class.

5. The computer-implemented method of claim 3, wherein the relation between said first option and said second option is chosen from one of the following group:
   a) said first option deselects said second option;
   b) said first option requires said second option;
   c) said first option forces said second option.

6. A computer-implemented method for configuring an item, wherein said item comprises two or more optional machine components, comprising the steps of:
   (1) creating two or more options, wherein said two or more options correspond to said two or more optional machine components;
   (2) associating attributes with each of said two or more options, wherein said attributes relate to characteristics of said two or more machine components;
   (3) creating, from said two or more options, a hierarchical option tree;
   (4) associating an option constraint with a first option of said two or more options, wherein said option constraint implements a relation between said first option and a second option,
      wherein said relation is based upon a relationship between those of said optional machine components corresponding to said first option and said second option;
   (5) selecting one or more options from said option tree;
   (6) implementing, responsive to said step (5), at least one attribute corresponding to said one or more selected options, and placing said at least one attribute into an instance creation file; and
   (7) accessing and utilizing said instance creation file during the operation of said item.

7. The computer-implemented method of claim 6, further comprising the steps of:
   (5) selecting one or more options from said option tree; and
   (6) implementing, responsive to said step (5), at least one attribute corresponding to said one or more selected options.

8. The computer-implemented method of claim 6, wherein said step (2) comprises the step of associating a designated option of said two or more options with an option class, wherein said option class contains inheritable attributes, and wherein at least some attributes of said designated option are thereby inherited from said option class.

9. The computer-implemented method of claim 8, wherein said step (2) comprises the step of associating a designated option of said two or more options with an option class, wherein said option class contains inheritable constraints, and wherein at least some constraints of said designated option are thereby inherited from said option class.

10. The computer-implemented method of claim 8, wherein the properties of all options in said option tree are stored together in a database.

11. The computer-implemented method of claim 10, wherein the properties of all options chosen using said configuration selector are stored together in a database, for use in operating the machine.

12. A system for configuring an item, wherein said item comprises two or more optional components, comprising:
   two or more options, wherein said two or more options corresponding to said two or more optional components;
   wherein each of said two or more options contains attributes relating to said two or more optional components;
   an option tree, wherein said two or more options are associated within a hierarchy;

a configuration selector, for allowing the selection of one or more options from said option tree; and a configuration generator, responsive to said configuration selector, for implementing at least one attribute corresponding to said one or more selected options, and placing said at least one attribute into an instance creation file, wherein said item accesses and utilizes said instance creation file during the operation of said item.

13. The system of claim 12, further comprising an editor for creating said attributes and for associating said attributes with said two or more options.

14. The system of claim 12, wherein at least some of said attributes of a designated option of said two or more options are inherited by associating said designated option with an option class, wherein said option class contains inheritable attributes.

15. The system of claim 12, further comprising an option constraint associated with a first option of said two or more options, wherein said option constraint implements a relation between said first option and a second option.

16. The system of claim 15, wherein at least some of said constraints of a designated option of said two or more options are inherited by associating said designated option with an option class, wherein said option class contains inheritable constraints.

17. The system of claim 15, wherein the relation between said first option and said second option is chosen from one of the following group:

a) said first option deselects said second option;
b) said first option requires said second option;
c) said first option forces said second option.

18. A system for configuring a machine, wherein said machine comprises two or more optional components, comprising:

two or more options, wherein said two or more options corresponding to said two or more optional machine components;

wherein each of said two or more options contains attributes for affecting said two or more optional machine components;

an option tree, wherein said two or more options are associated within a hierarchy; and an option constraint, associated with a first option of said two or more options, wherein said option constraint implements a relation between said first option and a second option, wherein said relation is based upon a relationship between those of said optional machine components corresponding to said first option and said second option;

an option selector, wherein said option selector selects one or more options from said option tree; and an implementor, wherein said implementor implements at least one attribute corresponding to said one or more selected options, and wherein said implementor places said at least one attribute into an instance creation file, wherein said machine accesses and utilizes said instance creation file during the operation of said machine.

19. The system of claim 18, further comprising:

a configuration selector, for allowing the selection of one or more options from said option tree; and a configuration generator, responsive to said configuration selector, for implementing at least one attribute corresponding to said one or more selected options.

20. The system of claim 19, wherein the properties of all options in said option tree are stored together in a database.

21. The system of claim 20, wherein the properties of all options chosen using said configuration selector are stored together in a database, for use in operating the machine.

22. A computer-readable medium for configuring an item, wherein said item comprises two or more optional components, by performing the steps of:

(1) creating two or more options, wherein said two or more options correspond to said two or more optional components;

(2) associating attributes with each of said two or more options, wherein said attributes relate to characteristics of said two or more components;

(3) creating, from said two or more options, a hierarchical option tree;

(4) selecting one or more options from said option tree;

(5) implementing, responsive to said step (4), at least one attribute corresponding to said one or more selected options, and placing said at least one attribute into an instance creation file; and (6) accessing and utilizing said instance creation file during the operation of said item.

23. The computer-readable medium of claim 22, wherein said step (2) comprises the step of associating a designated option of said two or more options with an option class, wherein said option class contains inheritable attributes, and wherein at least some attributes of said designated option are thereby inherited from said option class.

24. The computer-readable medium of claim 22, further comprising the step of associating an option constraint with a first option of said two or more options, wherein said option constraint implements a relation between said first option and a second option.

25. The computer-readable medium of claim 24, wherein said step (2) comprises the step of associating a designated option of said two or more options with an option class, wherein said option class contains inheritable constraints, and wherein at least some constraints of said designated option are thereby inherited from said option class.

26. The computer-readable medium of claim 24, wherein the relation between said first option and said second option is chosen from one of the following group:

a) said first option deselects said second option;
b) said first option requires said second option;
c) said first option forces said second option.

* * * * *